E. L. AIKEN.
PROCESS AND APPARATUS FOR MOLDING.
APPLICATION FILED OCT. 18, 1912.
1,190,072.
Patented July 4, 1916.
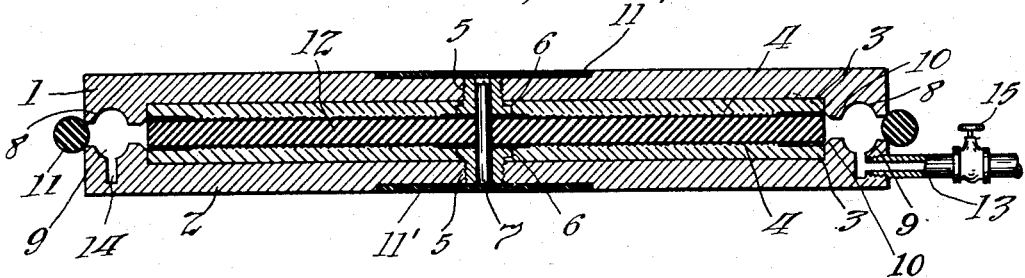
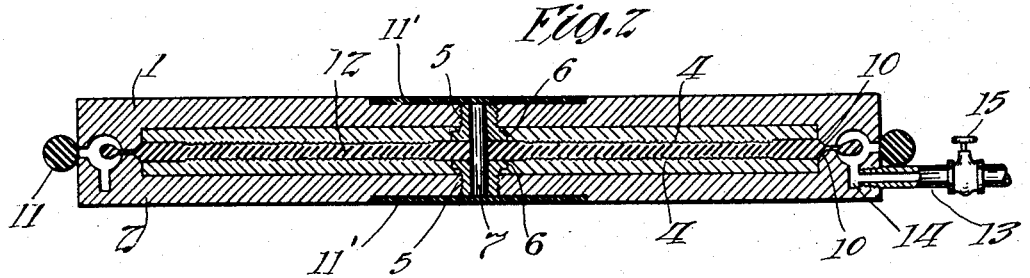

UNITED STATES PATENT OFFICE.

EDWARD L. AIKEN, OF ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

PROCESS AND APPARATUS FOR MOLDING.

1,190,072.     Specification of Letters Patent.     Patented July 4, 1916.

Application filed October 18, 1912. Serial No. 726,425.

*To all whom it may concern:*

Be it known that I, EDWARD L. AIKEN, a citizen of the United States and a resident of Orange, in the county of Essex and State of New Jersey, have invented a certain new and useful Improvement in Processes and Apparatus for Molding, of which the following is a description.

My invention relates to processes and apparatus for molding, especially to those for use in connection with the pressing of disk sound records from a mass of plastic record material.

The principal objects of my invention are to facilitate the making of a true and faithful sound record or other similar molded object and to provide other improvements as will hereinafter appear.

In the molding of objects by the pressing of a mass of plastic composition, such as a plastic sound record blank, against the face or mold surface of a mold, the accuracy of the impression in the molded object is frequently impaired by reason of the entrapping of air between the composition and the mold when the former is pressed into the latter. This defect is especially marked when the object to be molded is a sound record; as the record surface of the mold or matrix is filled with small elevations corresponding in negative to the record undulations, between which elevations the air is entrapped to such an extent as to render the resultant record very imperfect. My invention contemplates the elimination of this objection by the exhaustion of the air from between the mold surface or surfaces and the plastic composition prior to the pressing operation, the vacuum thus obtained being maintained until the composition has been pressed or formed into shape.

In order that my invention may be more clearly understood, attention is hereby directed to the accompanying drawing forming a part of the specification and in which—

Figure 1 is a central vertical sectional view showing one form of my improved apparatus prior to the application of pressure in the molding operation; and Fig. 2 is a similar view showing the same apparatus after the application of pressure in the molding operation.

In both of the views, like parts are designated by the same reference numerals.

The apparatus shown comprises superposed flat mold plates 1 and 2, each having a central depressed portion 3 in which is secured a sound record matrix 4, each matrix as shown being provided with the usual reverse or negative of the sound record undulations. The matrices are secured in position in their respective mold plates by annular bushings 5 threaded into the mold plates and provided with headed portions 6 bearing upon the matrices 4 and seated in recesses in the latter. A centering pin 7 mounted in the lower bushing 5 and preferably secured therein, as by friction, is adapted to be passed into the central opening in the other bushing so as to hold the mold plates in alinement. The mold herein shown is what is termed a "flash mold", that is, a mold in which the excess material is forced out between the mold surfaces of the opposing mold plates, as shown in Fig. 2, when these plates are brought together in pressing the plastic composition into shape. In the mold shown, this excess material is forced into the hollow space between annular recesses 8 and 9 formed in the mold plates 1 and 2 respectively a slight distance beyond the periphery of the matrices 4 and concentrically with the latter, the portions of the opposing mold plates between the recesses 8 and 9 and the matrices 4 being so shaped as to leave the said recesses in communication with the space between the matrices during the pressing operation. The mold plates are preferably provided with inclined surfaces 10, 10 for forming the periphery of the record during the pressing operation, these surfaces 10 being so inclined that the finished record has its largest diameter midway between its flat or record bearing surfaces.

In order to render the mold air tight so as to permit of the production of a vacuum therein, I provide a ring 11 of rubber or other suitable yielding material of such a size that the same is adapted to fit closely against the peripheral portions of the mold plates 1 and 2 to close or seal the space between said plates, as clearly shown in Figs. 1 and 2. Disks 11' of rubber or other suitable yielding material may be placed in recesses in the outer faces of the plates 1 and 2 and over the ends of the pin 7 and the outer ends of the bushings 5 to prevent the entrance of air around the end portions of the said pin to the space between the mold plates. It will be seen that by reason of the yielding character of the ring 11, the mold plates may be moved toward each other from the position shown in Fig. 1 a sufficient amount to permit the molding of the record without disturbing the vacuum between the said plates. To permit the ready extraction of the air from the space between the mold plates, I provide a hollow tubular connection 13 threaded into the lower mold plate 2 and communicating at its inner end with an annular slot 14 which in turn communicates with the bottom of the recess 9. The outer end of the connection 13 is adapted to be connected with a suction pump or any other suitable air exhausting means whereby, after the mold plates and the ring 11 are in the positions indicated in the drawing, air may be exhausted from the mold through the space between the recesses 8 and 9 and the connection 13. A valve 15 is preferably provided in the connection 13 so as to permit the closing of the said connection to maintain the vacuum in the mold after the air has been exhausted from the latter.

In using the apparatus described above, the matrices 4, 4 are first secured in position by the bushings 5, after which the plastic composition, such as the disk record blank or tablet 12 shown, and the upper mold plate are placed in position on the centering pin 7 with the matrices in contact with the faces of the blank or tablet. The ring 11 is then placed in position around the mold plates to close or seal the space between the same, as shown, after which the valve 15 is opened and the air is withdrawn from the mold. While theoretically best results would be obtained by the production of a complete vacuum, I find that very satisfactory results are obtained by a vacuum of 25" to 27" of mercury.

The term "vacuum" in the appended claims is used in a general sense and is intended to cover any suitable partial vacuum.

A vacuum having thus been produced in the mold, the valve 15 is closed and the mold plates are forced toward each other in a suitable press, the composition of the blank 12 being first rendered sufficiently plastic, as by the application of heat. Of course, the valve 15 may, if desired, be kept open and the suction kept up during the pressing operation. During the latter operation, the surplus composition will be forced into the recesses 8 and 9 and the record will be molded to substantially correct form, the record undulations being faithfully reproduced in the finished record. All that remains to be done is to permit the molded record to become hardened, as by cooling in the atmosphere, after which air may be admitted between the mold plates, and the ring 11 and the finished record removed.

While I have described my invention in connection with the molding of disk sound records in which the record impression is formed in both of the faces of the record, it is evidently applicable as well to the molding of records in which the sound record impressions are formed in only one face of the record and also to many other types of molded articles.

Many other changes may be made in the invention as specifically described above and I do not, therefore, limit myself to the exact details shown.

What I claim as new and desire to protect by Letters Patent of the United States is as follows:

1. The process of molding tablets which comprises placing moldable material between two mold plates, sealing the space between said plates to render the same air tight, withdrawing air from between said plates peripherally of said material and producing a vacuum in said space, rendering said material plastic, and pressing the same to shape between said plates while maintaining said vacuum, substantially as set forth.

2. The process of molding disk records which comprises placing moldable material between two mold plates, one of which contains a mold surface having a negative or reverse copy of record undulations therein, sealing the space between said plates to render the same air tight, withdrawing air from between said mold surface and said material peripherally of said material and producing a vacuum in said space, rendering said material plastic, and pressing the same to shape between said plates while maintaining said vacuum, substantially as set forth.

3. The process of molding disk records which comprises placing moldable material between two mold plates, each having a mold surface containing a negative or reverse copy of record undulations, sealing the space between said plates to render the same air tight, withdrawing air from between said mold surfaces and said material peripherally of said material and producing a vacuum in said space, rendering said material plastic, and pressing the same to shape between said plates while maintaining said vacuum, substantially as set forth.

4. The process of molding tablets which comprises placing moldable material between two mold plates, sealing the space between said plates with a ring of yielding material to render the same air tight, withdrawing air from between said plates peripherally of said material and producing a vacuum in said space, rendering said material plastic and pressing the same to shape between said plates while maintaining said vacuum, substantially as set forth.

5. The process of molding disk records which comprises placing moldable material between two plates, one of which contains a mold surface having a negative or reverse copy of record undulations therein, sealing the space between said plates with a ring of yielding material to render the same air tight, withdrawing air from between said mold surface and said material peripherally of said material and producing a vacuum in said space, rendering said material plastic, and pressing the same to shape between said plates while maintaining said vacuum, substantially as set forth.

6. The process of molding disk records which comprises placing moldable material between two mold plates, each having a mold surface containing a negative or reverse copy of record undulations, sealing the space between said plates with a ring of yielding material to render the same air tight, withdrawing air from between said mold surfaces and said material peripherally of said material and producing a vacuum in said space, rendering said material plastic, and pressing the same to shape between said plates while maintaining said vacuum, substantially as set forth.

7. In apparatus of the class described, the combination of a plurality of superposed mold plates, means for sealing the space between the same to prevent the entrance of air to said space, and means whereby air may be exhausted from said space, substantially as described.

8. In apparatus of the class described, the combination of a plurality of superposed mold plates, a ring of yielding material surrounding said plates for sealing the space between the same to prevent the entrance of air to said space, and means whereby air may be exhausted from said space, substantially as described.

9. In apparatus of the class described, the combination of a plurality of superposed mold plates, means for sealing the space between the same to prevent the entrance of air to said space, and a hollow connection communicating with said space whereby air may be exhausted from the latter, substantially as described.

10. In apparatus of the class described, the combination of a plurality of superposed mold plates, a ring of yielding material surrounding said plates for sealing the space between the same to prevent the entrance of air to said space, and a hollow connection communicating with said space whereby air may be exhausted from the latter, substantially as described.

11. In apparatus of the class described, the combination of a plurality of superposed mold plates, means for sealing the space between the same to prevent the entrance of air to said space, a hollow connection communicating with said space whereby air may be exhausted from the latter, and a valve in said connection for opening or closing the same, substantially as described.

12. In apparatus of the class described, the combination of a plurality of superposed mold plates, one of said plates having a central molding portion and an annular recess surrounding said molding portion, means for sealing the space between said plates to prevent the entrance of air to said space, and means communicating with said recess whereby air may be exhausted from the space between said plates, substantially as described.

13. In apparatus of the class described, the combination of a plurality of superposed mold plates each having a central molding portion and an annular recess surrounding said molding portion and communicating with the space between said molding portions, and means for sealing the space between said plates to prevent the entrance of air to said last named space, one of said plates having means communicating with said recesses whereby air may be exhausted from the space between said plates, substantially as described.

14. As a new article of manufacture, a mold plate having an inner molding portion, a recess surrounding said molding portion, and a hollow connection leading from said recess, substantially as described.

15. As a new article of manufacture, a mold plate having an inner molding portion, a recess surrounding said molding portion, a hollow connection leading from said recess, and a valve for closing said connection, substantially as described.

16. In apparatus of the class described, the combination of a plurality of superposed mold plates, one of said plates having a central opening therein, means for sealing the space between said plates to prevent the entrance of air into said space, means for sealing said opening, and means whereby air may be exhausted from said space, substantially as described.

This specification signed and witnessed this 11th day of October, 1912.

EDWARD L. AIKEN.

Witnesses:
FREDERICK BACHMANN,
MARY J. LAIDLAW.